United States Patent [19]

Knechtel et al.

[11] 4,116,561

[45] Sep. 26, 1978

[54] COPYING APPARATUS

[75] Inventors: Wilhelm Knechtel, Biebertal; Taisuke Tokiwa, Fernwald, both of Fed. Rep. of Germany

[73] Assignee: Canon Kabushiki Kaisha, Tokyo, Japan

[21] Appl. No.: 805,564

[22] Filed: Jun. 10, 1977

[30] Foreign Application Priority Data

Jun. 16, 1976 [DE] Fed. Rep. of Germany ....... 2620917

[51] Int. Cl.$^2$ .............................................. G03B 27/34

[52] U.S. Cl. ...................................................... 355/57

[58] Field of Search .................................. 355/47-52, 355/55-57, 60, 66, 8, 11, 67, 71

[56] References Cited

U.S. PATENT DOCUMENTS

| | | | |
|---|---|---|---|
| 3,476,478 | 11/1969 | Rees | 355/60 X |
| 3,535,037 | 10/1970 | Koizumi | 355/57 |
| 3,572,924 | 3/1971 | Matsumoto et al. | 355/57 X |
| 3,614,222 | 10/1971 | Post et al. | 355/60 X |
| 3,711,199 | 1/1973 | Koizumi | 355/57 |
| 3,884,574 | 5/1975 | Doi et al. | 355/66 |
| 4,040,733 | 8/1977 | Satomi | 355/8 |

OTHER PUBLICATIONS 98318-1971, Japanese Amemiya Application 9/1973.

*Primary Examiner*—Donald A. Griffin
*Attorney, Agent, or Firm*—Fitzpatrick, Cella, Harper & Scinto

[57] ABSTRACT

A copying apparatus having a changeable copying magnification is provided with focusing lens means having a variable focal length positionally fixed as a whole, and optical path length changing means for increasing or reducing the length of the optical path before or behind the focusing lens. An original to be copied and a photosensitive medium are selectively brought into one of a conjugate relationship for forming a life-size image and a conjugate relationship for forming a reduced or a magnified image. Desirably, the optical path length changing means displaces the optic axis in order to register one side edge of the image at different magnifications to a predetermined position on the photosensitive medium.

24 Claims, 14 Drawing Figures

COPYING APPARATUS

BACKGROUND OF THE INVENTION

1. Field of the Invention

This invention relates to a copying apparatus, and more particularly to a copying apparatus having a variable copying magnification.

2. Description of the Prior Art

An example of a copying apparatus having a variable copying magnification is disclosed in U.S. Pat. No. 3,476,478. This apparatus has an auxiliary lens movable into and out of the image side optical path (or the object side optical path) of a main focusing lens. By the movement of such auxiliary lens into or out of said optical path, the focal length of the focusing lens device is changed for decrease or increase. Also, in this apparatus, the focusing lens device is movable as a whole on its optic axis by a distance corresponding to the amount of variation in the focal length, toward the object side, i.e. the original side, or toward the image side, i.e. the photosensitive medium side, whereby the original to be copied and the photosensitive medium may be brought into a new optically conjugate relationship. Since, in the apparatus of this U.S. Pat. No. 3,476,478, the focusing lens device must be moved back or forth along its optic axis as noted above when the copying magnification is to be changed, it is impossible to provide coincidence between the side edges of the image formed at various magnifications on the photosensitive medium. For example, if a life-size image (A-3) of an original of A-3 size and an A-4 size image of the original of the same size were successively formed on the photosensitive medium, the leading end edges of these images could be made coincident by suitably synchronizing the rotation of the photosensitive drum with the scanning time of the original, but their side edges would be separate from each other. This is inconvenient to the copying apparatus of the type in which the side edge of transfer paper, whatever size it may be, must be registered to a predetermined line on the photosensitive medium.

The apparatus disclosed in U.S. Pat. No. 3,614,222 or Japanese Open Patent Application No. 99335/1975 has a movable focusing lens and a movable mirror in the optical path between the focusing lens and the object to be copied. When the copying magnification is to be changed, the positions of the lens and the mirror are changed to vary the object side optical path length and the photosensitive medium side optical path length, whereby the object and the photosensitive medium may be brought into a new conjugate relationship. In that case, the focusing lens is designed to be moved in a direction intersecting the optic axis, thereby enabling the side edges of the images at various magnifications to be coincident with each other. However, the apparatus of U.S. Pat. No. 3,614,222 or Japanese Open Patent Application No. 99335/1975 employs a fixed focal length lens and applies such lens to any copying magnification. On the other hand, it is difficult to design a fixed focal length lens which will have a high performance for any copying magnification. In other words, it is difficult to design a fixed focal length lens such that the fixed focal length lens which displays the highest performance in forming an image at a certain magnification also displays the highest performance in forming images at the other magnifications. It is therefore difficult for the above-described apparatus to produce copy images of high quality.

Further, in any of the well-known apparatuses described above, the focusing lens system is designed to be moved and this necessitates the provision of precise means for moving and positioning the lens system.

SUMMARY OF THE INVENTION

It is a primary object of the present invention to provide a copying apparatus having a variable copying magnification which is simple in construction.

It is another object of the present invention to provide a copying apparatus which will ensure copy images of high quality for any copying magnification.

It is still another object of the present invention to provide a copying apparatus having a variable copying magnification which will readily enable the side edges of images formed at various magnifications on a photosensitive medium to be coincident with each other.

The copying apparatus of the present invention is provided with a focusing lens device having a focal length variable in accordance with a selected copying magnification, and this focusing lens device as a whole is positionally fixed with respect to the optical path. In addition to the lens device, the device of the present invention is provided with means for changing the length of the optical path between the lens device and an object to be copied or the length of the optical path between the lens device and the photosensitive medium. When the focal length of the focusing lens device is changed and the length of the object side optical path or the image side optical path is correspondingly changed, even if the position of the focusing lens device is fixed as a whole, the object to be copied and the photosensitive medium are brought into an optically conjugate relationship for the formation of life-size image, reduced image or magnified image corresponding to the selected copying magnification. Further, the means for changing the length of the optical path may also contribute to displacing the optic axis of the focusing lens device laterally on the object or on the photosensitive medium. By said optic axis being displaced to a position corresponding to the selected copying magnification, images at any magnifications may be formed with their side edges being coincident with a predetermined line on the photosensitive medium. Here, the focusing lens device positionally fixed as a whole with respect to the optical path refers to a focusing lens device whose major lens portion is positionally fixed in the optical path, and it includes a lens device comprising a positionally fixed main focusing lens and an auxiliary lens movable into and out of the optical path of the main focusing lens to change the focal length.

Other objects and features of the present invention will become apparent from the following detailed description taken in conjunction with the accompanying drawings.

DESCRIPTION OF THE PREFERRED EMBODIMENTS

Figure 1:
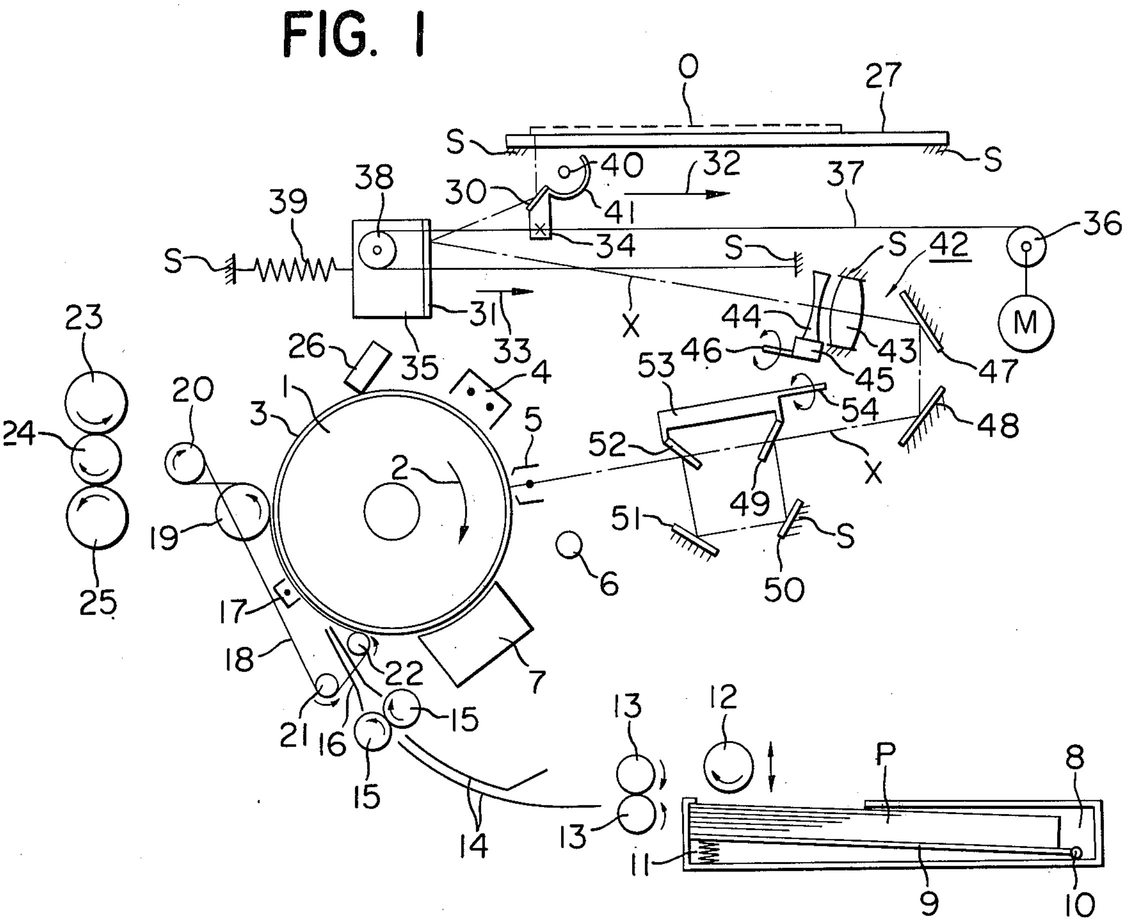
FIG. 1 illustrates an embodiment of the present invention.

FIG. 1 illustrates an embodiment of the present invention. A drum 1 rotated at a constant velocity in the direction of arrow 2 by a motor (not shown) has on the peripheral surface thereof an electrophotographically sensitive medium 3 comprising a conductive layer, a photoconductive semiconductor layer and a transparent insulative layer successively superposed upon one another. A corona discharger 4 serves to uniformly charge the surface of the photosensitive medium 3. The charging polarity of the discharger is positive if the photoconductive layer is an N-type semiconductor, and negative if the photoconductive layer is a P-type semiconductor. At an image exposure station, the photosensitive medium 3 uniformly charged is exposed to the optical image of an original O to be copied by an optical system which will later be described, and simultaneously therewith, the photosensitive medium is subjected to AC corona discharge or DC corona discharge opposite to the charging polarity of the discharger 4, by a discharger 5. By this, an electrostatic latent image corresponding to the original O is formed on the photosensitive medium 3. Further, the whole surface of the photosensitive medium 3 is illuminated by a lamp 6, whereby the contrast of the latent image is improved. Where the photosensitive medium 3 is non-crystalline selenium or the like, the discharger 5 may be replaced by a mere optical slit and the lamp 6 is unnecessary. The latent image formed on the photosensitive medium 3 is developed into a visible toner image by a well-known developing device 7, such as, for example, a magnet brush type developing device. The toner image comes to an image transfer section with the rotation of the drum 1, and is transferred to a sheet of transfer paper P.

Sheets of transfer paper P are piled in layers on a support plate 9 within a paper feed cassette 8, and the support plate 9 is pivotable about a shaft 10 and upwardly biased by a spring 11. A rotating take-out roller 12 is lowered into contact with the transfer paper in the cassette at a point of time before the photosensitive medium 3 begins to be exposed to the original image, and is maintained at the lowered position for a short time to deliver an uppermost sheet of transfer paper from within the cassette to feed rollers 13 by friction force. By their rotation, the rollers 13 feed that sheet of transfer paper P to timing rollers 15. The transfer paper P remains stationary in a guide 14 until the timing rollers start rotating. When the leading end of the image on the photosensitive medium 3 reaches the terminal end of the developing device 7, or when the leading end of the image reaches the vicinity of the location equal to the distance from the image transfer position to the timing rollers 15, the timing rollers 15 start rotating to transport the transfer paper P at a velocity equal to the peripheral velocity of the photosensitive medium 3. By this, the transfer paper P is brought into contact with the toner image formed on the photosensitive medium 3, with the leading edge of the transfer paper P or a line slightly inward of the leading edge of the transfer paper P being coincident with the leading end of the toner image. Designated by 16 is a guide for guiding the transfer paper P to the image transfer position. A discharger 17 is provided to impart to the back side of the transfer paper P corona discharge opposite in polarity to the charge of the toner forming the image, thereby enhancing the image transfer efficiency. A very narrow belt 18 extends over and between pulleys 19, 20, 21 and 22 and is moved round at a velocity equal to the peripheral velocity of the photosensitive medium 3 by rotation of the pulley 19 which is the drive pulley. The belt 18 is brought into contact with an end area of the photosensitive medium 3 on which no image is formed. The conveyor system comprising members 8, 12, 13, 14, 15 and 16 is designed to transport the transfer paper P into the image transfer position so as to bring one side edge portion of the transfer paper P onto the belt 18. Thus, at the location of the roller 19, the transfer paper P is separated from the photosensitive medium 3 by the belt 18. The transfer paper with the toner image transferred thereto is passed between a fixing roller 24 rotating in contact with a heating roller having a heat source therewithin and a press roller 25, whereby the toner image is fixed, and then the transfer paper is delivered into a reception tray, not shown. Any residual toner remaining on the surface of the photosensitive medium after the image transfer is wiped off by a resilient blade having its end edge urged against the photosensitive medium 3 and thus, the photosensitive medium 3 with its surface cleaned enters another cycle of image processing which is similar to what has been described above. Cassettes 8 for various sizes of transfer paper are prepared in accordance with desired copying magnifications. Any of the cassettes is disposed at the cassette station in such a manner that the transfer paper of different size contained in the cassette is positioned with the leading edge and one side edge of the paper coincident with respective predetermined locations. Thus, any size of transfer paper may be conveyed so that the leading edge thereof is in contact with the vicinity of the leading end of the image while said one side edge of the transfer paper rides on the belt 18.

The electrophotographic copying machine of the abovedescribed construction is well-known in the art.

The original O is placed on a transparent original carriage 27 fixed to the structural base S of the copying machine. The carriage 27 is provided with marks or positioning projections 28 and 29 to which the forward end edge and one side edge of the original O are to be registered (See FIG. 2). The mark 28 is perpendicular to the scanning direction and the mark 29 is parallel to the scanning direction. Any size of original should desirably be positioned with these marks or projections 28 and 29 as the reference. The original O is scanned by the scanning optical system. The scanning optical system is provided with a first 30 and a second movable mirror 31 which are movable in the directions of arrows 32 and 33, respectively, and in parallelism to the original carriage 27. The mirror 30 is movable over a distance sufficient to scan at least from a point slightly ahead of the forward end edge of the original O to the rearward end edge of the original, and the mirror 31 is movable over one half of the moving distance of the mirror 31. By this, the length of the optical path between the original carriage 27 and the lens device to be described is maintained constant. The means for moving the mirrors 30 and 31 is provided with a support 34 for the mirror 30 and a support 35 for the mirror 35. A length of wire 37 having one end secured to a which drum 36 is wrapped about a pulley 38 rotatably mounted on the second mirror support 35. The other end of the wire 37 is secured to the structural base S of the copying machine. The first mirror support 34 is secured to the wire 37 between the pulley 38 and the drum 36. Designated by 39 is a tension spring having one end connected to the structural base S of the copying machine and the other end connected to the second mirror support 35 so that the tension spring can store a tension therein by the movement of the second mirror in the direction of arrow 33. The drum 36 is driven from a motor M whose number of revolutions is changeable in accordance with the copying magnification selected. The motor M is synchronized with the rotation of the drum 1 and starts running just before the exposure begins. With the rotation of the drum 36, the wire 37 is drawn at a velocity equal to the peripheral velocity of the photosensitive medium 3 multiplied by the inverse number of the selected copying magnification. Thus, the first mirror 30 is moved in the direction of arrow 32 at the velocity equal to the peripheral velocity of the photosensitive medium 3 multiplied by the inverse number of the copying magnification, and the second mirror 31 is moved in the direction of arrow 33 at one half of said velocity. As soon as the original O has been scanned, the motor M stops running and the mirrors 30 and 31 are returned to their start positions by the tension of the spring 39. A lamp 40 for illuminating the original and a reflector 41 are both integrally secured to the support 34 of the first mirror 31. Thus, the lamp 40 and reflector 41 are movable with the first mirror 30.

The light from the original O is reflected by the first 30 and the second mirror 31 in succession, whereafter the light is directed to a focusing lens device 42 which as a whole is positionally fixed with respect to the optical path. The focusing lens device 42 has a main focusing lens 43 secured to the structural base S of the copying machine and an auxiliary lens 44 movable into and out of the optical path before the main focusing lens 43. In the illustrated embodiment, the auxiliary lens 44 has a negative power and thus, where the auxiliary lens 44 is disposed in the optical path as shown, the focal length of the focusing system comprising the lenses 43 and 44 is longer than the focal length of the main focusing lens 43 singly. The main focusing lens 43, when singly used, namely, when the auxiliary lens 44 and the movable mirror to be described are retracted from the optical path, is disposed so as to focus the life-size image of the original upon the photosensitive medium 3 at the exposure station. (In case of the life-size focusing, the length of the optical path between the original carriage and the lens and the length of the optical path between the lens and the photosensitive medium are each equal to double the focal length of the lens.) The auxiliary lens 44 is secured to a support 45 which in turn has a rotating shaft 46 parallel to the optic axis X of the lens 43. By the rotation of the shaft 46, the auxiliary lens 44 is selectively moved into or out of said optical path.

The light beam passed through the focusing lens device 42 is reflected by mirrors 47 and 48 in succession, and then, in case of life-size copying magnification, namely, when the auxiliary lens 44 is retracted from the optical path, the light beam directly travels to the optical opening of the corona discharger 5 and passes through such opening to the photosensitive medium 3. When the auxiliary lens 44 comes into the optical path as shown, the length of the optical path between the lens device 42 and the photosensitive medium 3 is increased by the actions of the mirrors 49, 50, 51 and 52.

Designated by 49 and 52 are movable mirrors which are movable into and out of the optical path between the focusing lens 42 and the photosensitive medium. The mirrors 49 and 52 are secured to a support 53 having a rotation shaft 54 parallel to the optic axis X of the lens device, and is selectively moved into or out of the optical path by the rotation of the shaft 54. When the mirrors 49 and 52 are inserted in the optical path, the light beam from the mirror 48 is reflected by the mirrors 49, 50 and 51 in succession and passes to the photosensitive medium 3 at the exposure station. The mirrors 50 and 51 are secured to the structural base S of the copying machine. When the mirrors 49 and 52 are in the optical path, the mirrors 49 and 50 are parallel to each other and the mirrors 51 and 52 are also parallel to each other. Let $f$ be the focal length of the main focusing lens 43 and $f + \Delta f$ be the focal length of the combined lens system provided by the main focusing lens 43 and the auxiliary lens 44 (note that $0 < \Delta f < f$). Then, the mirrors 49, 50, 51 and 52 are disposed so as to increase the length of the optical path by $4\Delta f \cdot f/(f - \Delta f)$. When the auxiliary lens 44 and mirrors 49, 52 are in the optical path as shown, the copying magnification becomes $(f + \Delta f)/(f - \Delta f)$. Thus, a magnified image is formed on the photosensitive medium.

If all the mirrors 49, 50, 51 and 52 are perpendicular to a plane containing the direction 2 of movement of the photosensitive medium and the optic axis X at least between the mirrors 48 and 49 (namely, the plane of the FIG. 1 sheet), the opposite side edges of the life-size image of the original O are not coincident with the opposite side edges of the magnified image.

Figure 2:
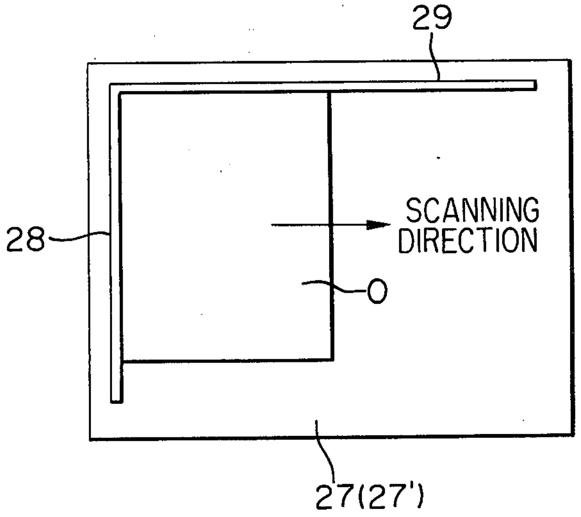
FIG. 2 illustrates an example of the original carriage.
Figure 3:
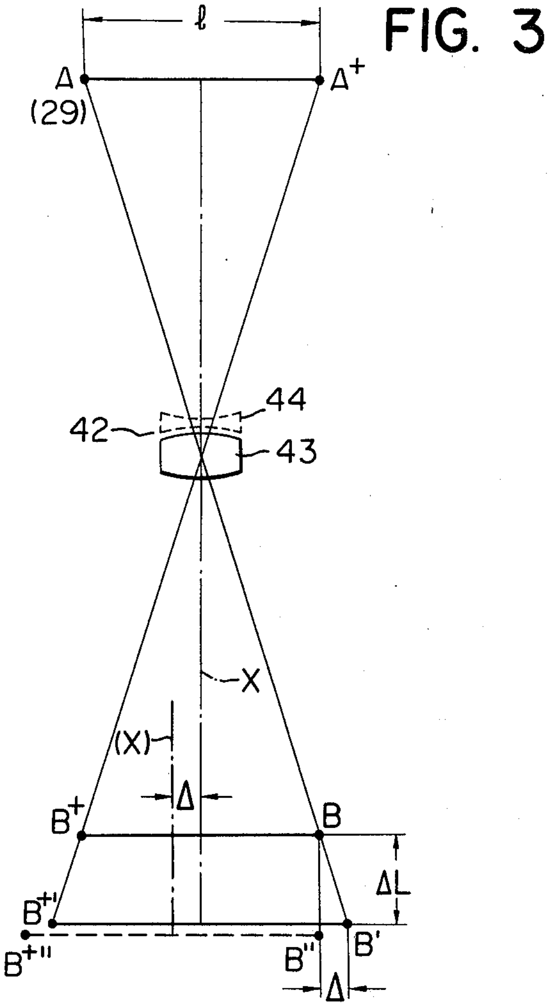
FIG. 3 illustrates the optical system according to an embodiment of the present invention.

FIG. 3 is a developed view of the optical path. The original is scanned in a direction perpendicular to the plane of the drawing sheet and the photosensitive medium is also moved at the exposure station in the direction perpendicular to the plane of the drawing sheet. When the auxiliary lens 44 and mirrors 49, 52 are out of the optical path, a life-size image $B - B^+$ of the original $A - A^+$ (the end A is positioned in registry with the line 29 in FIG. 2) is formed on the photosensitive medium. When the auxiliary lens 44 and mirrors 49, 52 come into the optical path, the length of the optical path on the image side is increased by $\Delta L = 4f \cdot f/(f - \Delta f)$ so that a magnified image $B' - B^{+\prime}$ is formed, but B is not coincident with B'. On the other hand, any size of transfer paper is transported in such a manner that one side edge thereof is positioned at or near B. Accordingly, the belt 18 is also positioned at or near B. (Actually, images $B - B^+$ and $B' - B^{+\prime}$ are formed on a common plane (photosensitive medium)). If the optic axis X of the focusing lens device passing to the photosensitive medium is parallel-displaced by a distance $\Delta$ toward $B^{+\prime}$ in the plane of the drawing sheet, there is formed an image $B'' - B^{+\prime\prime}$. The amount of displacement $\Delta$ of the optic axis for the points B and B'' to become coincident with each other is equal to the distance between the points B and B'. Assuming that the distance between the opposite ends of the original $A - A^+$ is $l$, $\Delta = \Delta f \cdot l/(f - \Delta f)$.

Figure 4:
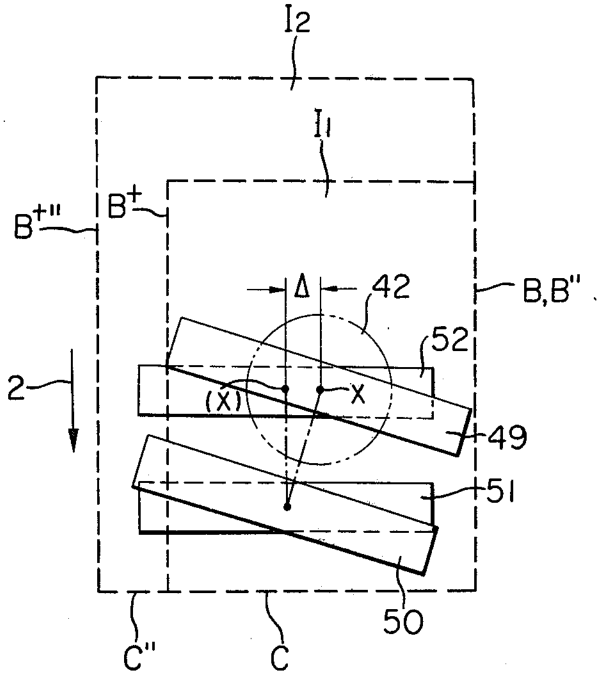
FIG. 4 illustrates the optical path length changing means for the optical system according to an embodiment of the present invention.

In the apparatus of FIG. 1, the aforementioned displacement of the optic axis is accomplished by tilting the mirrors 49, 50 and/or the mirrors 51, 52 from a plane perpendicular to the plane containing the optic axis X between the mirrors 48 and 49 (namely, the optic axis which passes to the photosensitive medium when the mirrors 49 and 52 are out of the optical path) and the rotational direction 2 of the photosensitive medium 3. It is to be noted, however, that the mirrors 49 and 50 are parallel to each other and the mirrors 51 and 52 are parallel to each other. The position in which the mirrors 49 and 50 are tilted from said plane is shown in FIG. 4. FIG. 4 is a view in which the mirror portions 47 and 48 of FIG. 1 are optically developed and seen from the lens device 42 toward the photosensitive medium along the optic axis X, and in which the life-size image $I_1$ and the magnified image $I_2$ formed on the photosensitive medium 3 through the lens device 42 are developed on a plane perpendicular to the optic axis (the plane of the drawing sheet). The end B of the image $I_1$ and the end B″ of the image $I_2$ are formed on predetermined lines on the photosensitive medium 3. The mirrors 49 and 50 are tilted from the above-described plane (in FIG. 4, the plane perpendicular to the plane of the drawing sheet containing the moving direction 2 of the photosensitive medium), and the mirrors 51 and 52 are perpendicular to that plane. By the actions of the mirrors 49, 50, 51 and 52, the optic axis (X) passing to the photosensitive medium is displaced by a distance Δ from the optic axis X between the lens device 42 and the mirror 49 in a direction perpendicular to the moving direction of the photosensitive medium 3 and away from the side edge B, B″ with which the images $I_1$ and $I_2$ are made coincident. The axes X and (X) are parallel to each other. The reason why the leading end edges C and C″ of the images $I_1$ and $I_2$ are coincident with each other is that irrespective of the magnification selected, the starting time of exposure of the photosensitive medium 3 is set to the point of time whereat the drum 1 has made a predetermined number of revolutions.

As an alternative to parallel-displacement of the optic axis, instead of tilting the mirrors 49 and 50, the mirrors 51 and 52 may be tilted with respect to the above-described plane or both pairs of mirrors 49, 50 and 51, 52 may be tilted with respect to the above-described plane. This could be understood if the images $I_1$ and $I_2$ were rotated in various directions on the plane of the FIG. 4 drawing sheet.

The above-described device for changing the length of the optical path including the mirrors 49, 50, 51 and 52 is also applicable in the optical path between the original carriage 27 and the focusing lens device 42, preferably, in the optical path between the second scanning mirror 31 and the lens device 42. In such a case, when the mirrors 49, 52 and the auxiliary lens 44 are inserted in the optical path, a reduced image of the original O is formed on the photosensitive medium 3. The length of the aforementioned optical path is increased by $4\Delta f \cdot f/(f - \Delta f)$ as in the above-described case. The magnification of the reduced image is $(f - \Delta f)/(f + \Delta f)$. In order that one side edge of the life-size image and one side edge of the reduced image be coincident with each other, the mirrors 49, 50 and/or the mirrors 51, 52 are tilted from a plane perpendicular to the plane (plane of the drawing sheet) containing the scanning directions (directions 32 and 33) and the optic axis X between the lens device 42 and the optical path length changing device, in the same manner as already described. By this, the optic axis passing to the original O is parallel-displaced by a distance Δ in a direction away from the side edge of the original O corresponding to that side edge of the image in question. It is seen that $\Delta = \Delta f \cdot l/(f - \Delta f)$. The reduced image will be described later again.

Figure 5:
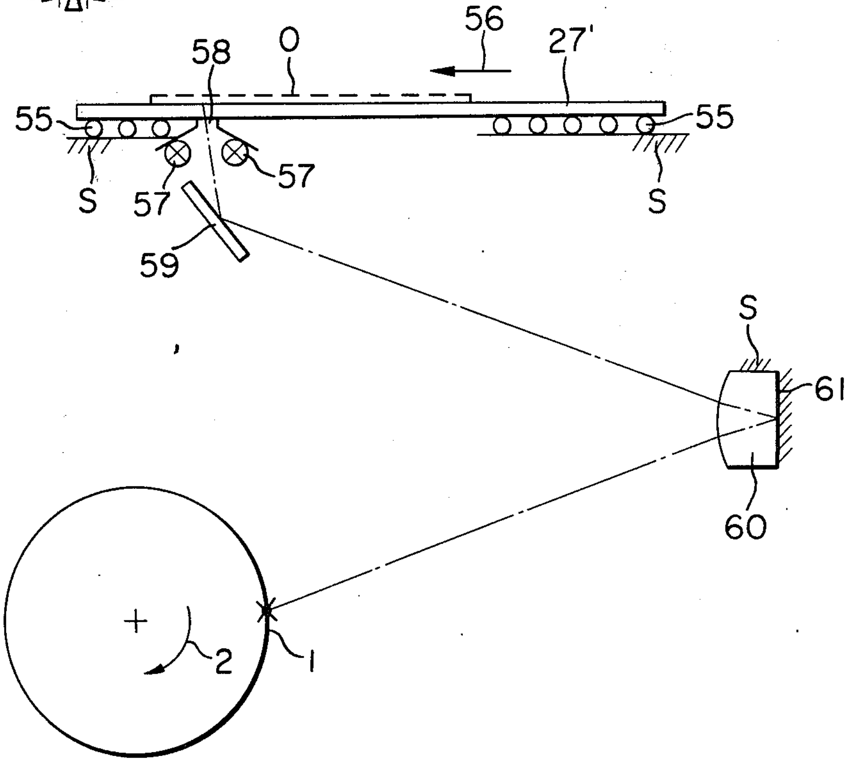
FIG. 5 is an illustration of another form of the copying apparatus to which the present invention is applicable.

The embodiment of FIG. 1 is such that the original carriage 27 is fixed to the structural base of the copying machine and the original O is scanned by the movable mirror system 30, 31, but the present invention is also applicable to the copying apparatus of the type as shown in FIG. 5 wherein the original carriage is movable.

In FIG. 5, most of the means common to those in FIG. 1 are omitted for simplicity of illustration.

A transparent original carriage 27′ having such original positioning means as shown in FIG. 2 is moved in the direction of arrow 56 by a feed device 55 provided on the structural base S of the copying machine, in synchronism with the rotation of the photosensitive drum 1, at least from a point of time immediately before the start of the exposure till the completion of the exposure. After the completion of the exposure, the feed device 55 returns the carriage 27′ to its initial position. The drawing speed of the feed device 55 is changeable in accordance with the copying magnification, and the original carriage 27′ is movable at a velocity equal to the peripheral velocity of the drum 1 multiplied by the inverse number of the copying magnification.

The original O placed on the movable original carriage 27′ is illuminated by a lamp 57 through an opening 58 formed in a light-intercepting member. The light beam passed from the original O through the opening 58 is deflected by a mirror 59 perpendicular to the plane of the drawing sheet so as to be directed to an in-mirror lens secured to the structural base S of the copying machine. The in-mirror lens has a bent portion 60 and a reflecting surface 61 and upwardly reflects the above-mentioned light beam toward the photosensitive drum 1 at the exposure position so as to cause the image of the original O over the opening 58 to be formed on the drum 1. In FIG. 1, the in-mirror lens is so disposed as to form a life-size image of the original. That is, the length of the optical path between the in-mirror lens and the original and the length of the optical path between the in-mirror lens and the original are 2*f* each. To change the copying magnification, the device of FIG. 6 is applied to the apparatus of FIG. 5.

Figure 6:
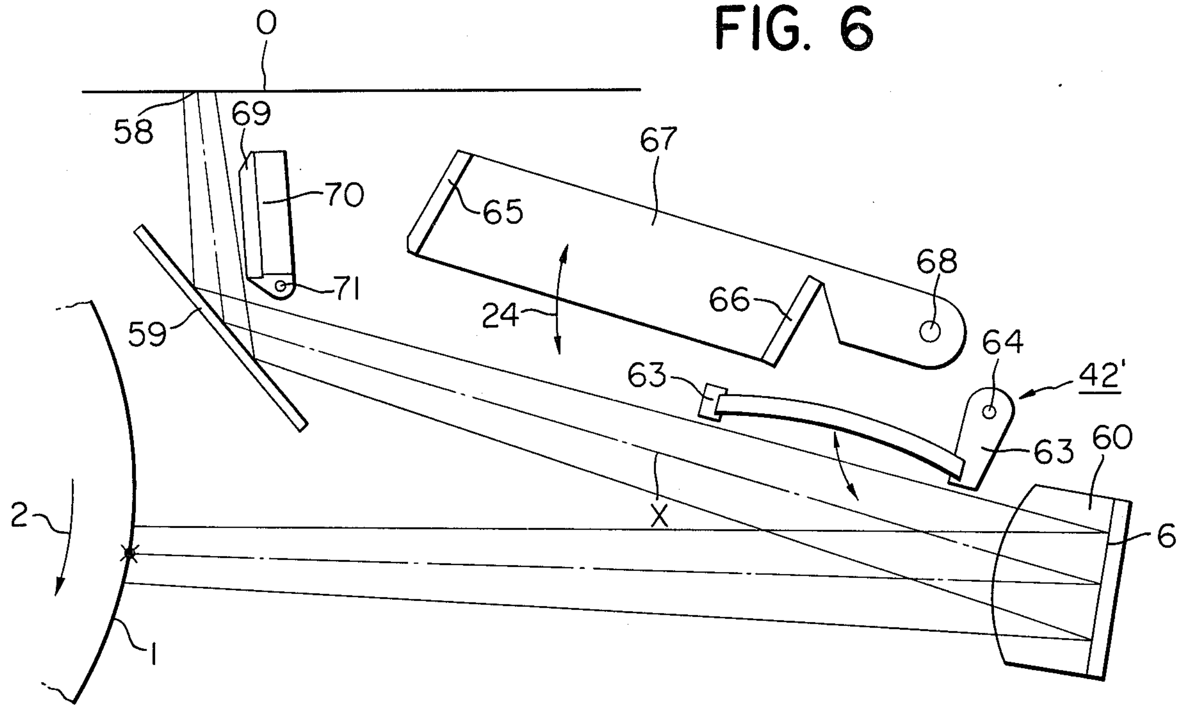
FIG. 6 illustrates the essential portions of another embodiment of the present invention.

In FIG. 6, designated by 62 is an auxiliary lens having a negative power and it forms a part of the focusing lens device 42′. The auxiliary lens 62 is supported on a support 63, which in turn is rotatable about a shaft 64 provided to the structural base of the copying machine, whereby the auxiliary lens 62 is movable toward and away from the front of the in-mirror lens which is the main focusing lens.

The auxiliary lens 62 imparts a refracting action to both the light beam incident on the in-mirror lens and the light beam emergent from the in-mirror lens. When the auxiliary lens 62 comes into the optical path, the focal lens 62 and the in-mirror lens becomes longer than the focal length of the in-mirror lens singly. A focusing lens device 42′ as a whole is positionally fixed with respect to the optical path.

Figure 7:
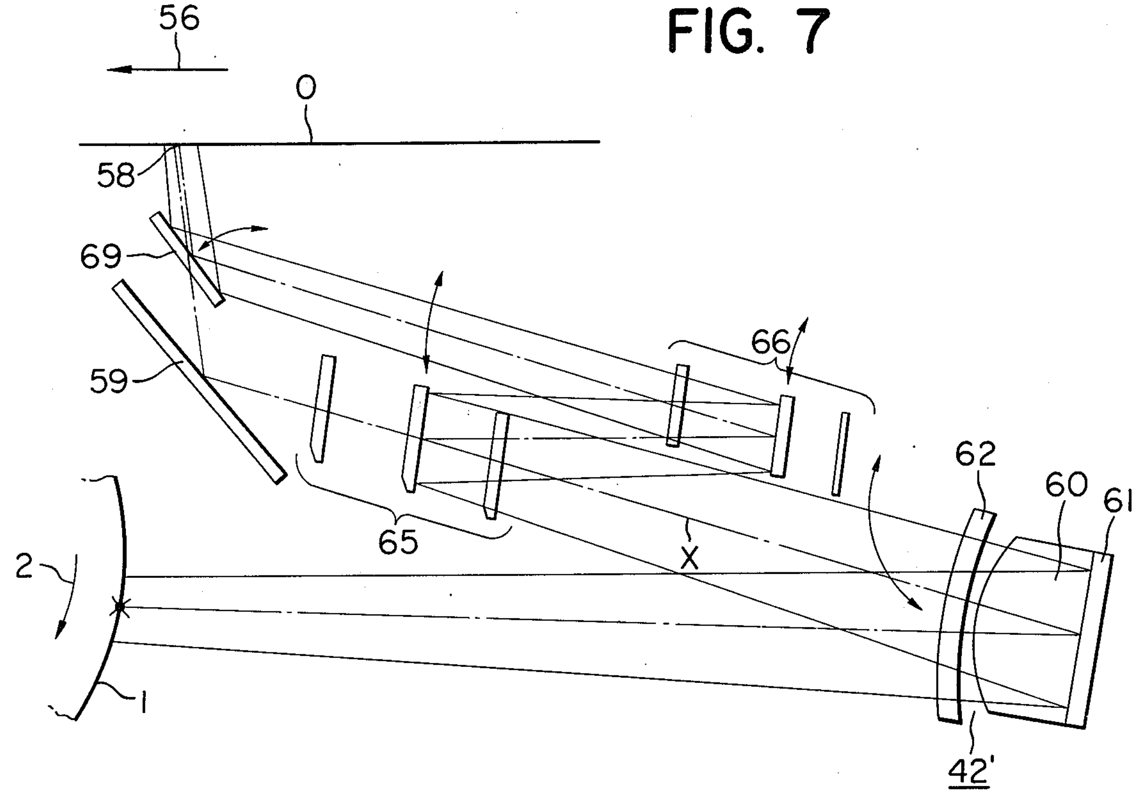
FIG. 7 illustrates a mode of operation of the FIG. 6 optical system.

The device of FIG. 6 is such that the length of the optical path between the lens device 42′ and the original O is increased when the auxiliary lens comes into the optical path in order to form a reduced image, for example, an image of A-4 size for an original of A-3 size. The optical path length changing device is provided with mirrors 65 and 66 which are parallel to each other. The mirrors 65 and 66 are fixed to a support 67, which in turn is rotatable about a shaft 68 provided to the structural base of the copying machine, whereby the mirrors 65 and 66 are movable into and out of the optical path between the lens device 42' and the original O. Once the mirrors 65 and 66 come into the optical path, the mirror 59 cannot deflect the light beam from the original O toward the mirror 66, as seen in FIG. 7. Therefore, the auxiliary mirror 69 secured to the support 70 rotatably supported on the shaft 71 provided to the structural base of the copying machine is inserted in the optical path between the mirror 66 and the original O. The mirror 69 reflects the light beam from the original O over the opening 58 so as to direct the light beam toward the mirror 66 along the optical path parallel to the optic axis X between the lens and the mirror 65. That is, the mirror 69 when inserted in the optical path is parallel to the mirror 59. Instead of using the auxiliary mirror 69, the mirror 59 may be made as a movable mirror which is parallel-movable to the position of the mirror 69 in FIG. 7. The mirrors 65 and 66 are arranged to increase the length of the optical path by $4f\cdot\Delta f/(f-\Delta f)$, where $f$ is the focal length of the in-mirror lens itself and $f+\Delta f(\Delta<\Delta f<f)$ is the focal length of the combined lens system provided by the in-mirror lens and the auxiliary lens. The copying magnifications provided by the device of FIG. 6 are Ix and $(f-\Delta f)/(f+\Delta f)$.

As already noted, if the mirrors 65 and 66 are perpendicular to the plane of the FIG. 7 sheet, namely, the plane containing at least the optic axis between the lens device and the mirror 65 and the feed direction 56 of the original carriage, the side edge of the life-size image and that of the reduced image are not coincident. In order that one side edge of the life-size image and one side edge of the reduced image may be coincident with each other, the optic axis passing to the original O is parallel-displaced in a plane perpendicular to the plane of the FIG. 7 sheet. This is illustrated in FIG. 9.

Figure 8:
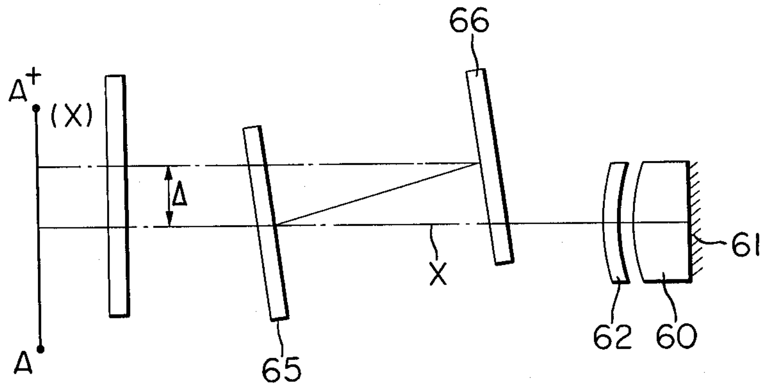
FIG. 8 is a plan view of the FIG. 7 optical system.
Figure 9:
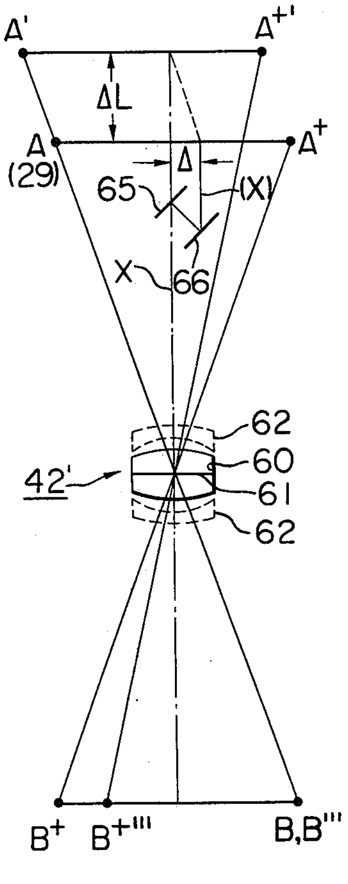
FIG. 9 illustrates the operation of the FIG. 6 optical system.

FIG. 9 is a developed view of the optical system as it is developed in the plane perpendicular to the feed direction of the original carriage. The side edge A of the original $A-A^{+}$ is registered to the positioning means 29 of the original carriage 27'. When the auxiliary lens 62 and mirrors 65, 66, 69 are out of the optical path, the life-size image $B-B^{+}$ of the original $A-A^{+}$ is formed on the photosensitive medium, with one side edge B of the image being positioned on a predetermined line on the photosensitive medium. When the auxiliary lens 62 and mirrors 65, 66, 69 are in the optical path, the length of the optical path between the focusing lens device 42' and the original is increased by $\Delta L=4f\cdot\Delta f/(f-\Delta f)$ and a reduced image $B'''-B^{+'''}$ is formed on the photosensitive medium. Since the mirrors 65 and 66, as shown in FIG. 7, are tilted from a plane perpendicular to the plane containing at least the optic axis X between the lens and the mirror and the moving direction of the original carriage, namely, the plane of the FIG. 7 sheet, the optic axis (X) passing to the original is parallel-displaced laterally from said optic axis by a distance $\Delta$ in the plane of the FIG. 9 sheet, as shown in FIG. 9. Thus, apparently, the original $A-A^{+}$ is positioned at $A'-A^{+'}$. It is to be noted that $\Delta=l\cdot\Delta f/(f-\Delta f)$, where $l$ is the length of the segment $AA^{+}$. By the displacement of the optic axis caused by the actions of the mirrors 65 and 66, one side edge B of the image $B-B^{+}$ and one side edge $B'''$ of the image $B'''-B^{+'''}$ are made coincident with each other. FIG. 8 is a view of the FIG. 7 optical system as seen from above the plane of the FIG. 7 sheet.

In the above-described embodiment, a lens device having a negative power is employed as the auxiliary lens, but a lens device having a positive power may also be employed as the auxiliary lens. In this latter case, the focal length of the combined lens system comprising the auxiliary lens and the main focusing lens is shorter than the focal length of the main focusing lens singly.

Figure 10:
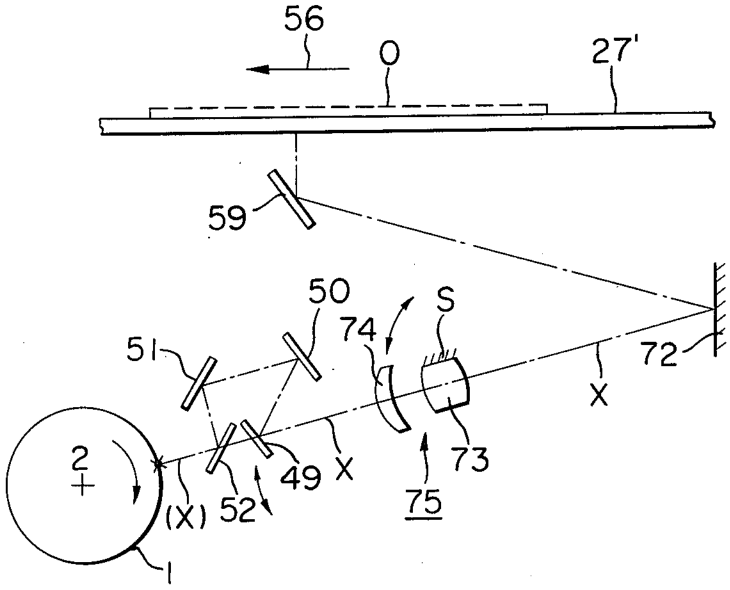
FIG. 10 illustrates still another embodiment of the present invention.

The apparatus of FIG. 10 has a movable original carriage 27' similar to that in the apparatus of FIG. 5. The light beam from the original O is reflected by mirrors 59 and 72 and passes to a through-lens 73 secured to the structural base S of the copying machine. Designated by 74 is an auxiliary lens having a positive power which is movable into and out of the optical path of a main focusing lens 73 by means similar to that shown in FIG. 5. During the formation of life-size image, the auxiliary lens 74 is retracted from the optical path. As in FIG. 1, mirrors 49, 50, 51 and 52 together constitute means for changing the length of the optical path between the focusing lens device 75 and the photosensitive medium 1, and mirrors 49 and 52 are movable into and out of the optical path by means similar to that in FIG. 1. The mirrors 49 and 50 are parallel to each other and the mirrors 51 and 52 are also parallel to each other. When the auxiliary lens 74 is out of the optical path, the mirrors 49 and 52 are inserted in the optical path, as shown, to equalize the length of the optical path between the main lens 73 and the photosensitive drum 1 and the length of the optical path between the main lens 73 and the original carriage 27', thereby forming a life-size image. When the auxiliary lens 74 comes into the optical path, the mirrors 49 and 52 are retracted from the optical path. Thus, the length of the optical path between the focusing lens device 75 and the photosensitive drum 1 is decreased so that a reduced image is formed. Let $f$ be the focal length of the main focusing lens 73 and $f-\Delta f(0<\Delta f<f)$ be the focal length of the combined lens system comprising the main lens 73 and the auxiliary lens 74. The magnification of the reduced image is $(f-\Delta f)/(f+\Delta f)$. The mirrors 49, 50, 51 and 52 are arranged such that movement of the mirrors 49 and 52 into the optical path increases the length of the optical path by $4f\cdot\Delta f/(f+\Delta f)$.

As already described with respect to the embodiment of FIG. 1, when the mirrors 49 and 52 are inserted in the optical path in order to make one side edge of the life-size image coincident with one side edge of the reduced image, the optical axis (X) passing to the photosensitive drum 1 is parallel-displaced by $\Delta=\Delta f\cdot l/(f+\Delta f)$ in a direction perpendicular to the plane of the drawing sheet, from the optic axis X between the lens device 75 and the mirror 49 (namely, the optic axis which passes to the drum when the mirrors 49, 52 are out of the optical path). The direction of the displacement is the direction away from that side edge of the image in question, as in FIG. 3. Such displacement of the optic axis is accomplished by the mirrors 49, 50 and/or 51, 52 being tilted from the plane perpendicular to the plane containing the rotational direction 2 of the drum and the optic axis, as described in connection with FIG. 4.

In FIG. 10, the optical path length changing means provided by the mirrors 49, 50, 51 and 52 is also applicable in the optical path between the lens device 75 and the original carriage 27', preferably between the lens device 75 and the mirror 59. In such case, when the lens 74 is out of the optical path but the mirrors 49, 52 are in the optical path, life-size copying can be accomplished and when the lens 74 is in the optical path but the mirrors 49, 52 are out of the optical path, magnified copying can be accomplished. In order that one side edge of the magnified image may be coincident with the corresponding side edge of the life-size image, the mirrors 49, 50 and/or 51, 52 are tilted with respect to the plane perpendicular to the plane containing the moving direction 56 of the original carriage and the optic axis passing to the original carriage 27', whereby the optic axis passing to the original carriage is parallel-displaced by $\Delta(=l\cdot\Delta f/(f-\Delta f)$ in the plane perpendicular to the direction 56 (the plane of the FIG. 10 sheet). The direction of this displacement is the direction away from that side edge of the original in question.

Figure 11:
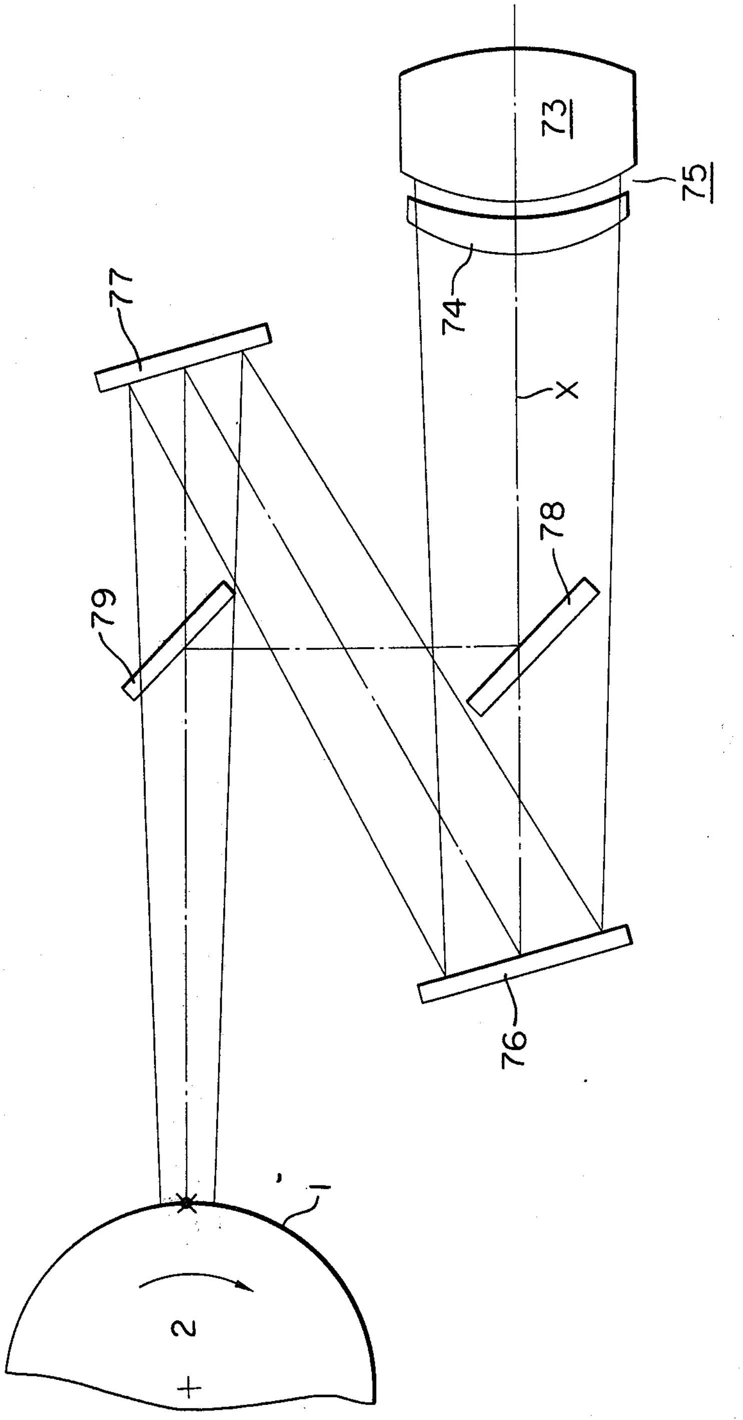
FIG. 11 illustrates yet still another embodiment of the present invention.

FIG. 11 shows another example of the optical system for changing the length of the optical path. This optical system is interchangeable with the optical system in any of the embodiments hitherto described, but in FIG. 11, this optical system is shown as applied to the device of FIG. 10. A first pair of parallel mirrors 76, 77 and a second pair of parallel mirrors 78, 79 are alternately or selectively moved into and out of the optical path. An auxiliary lens 74 having a positive power is moved into and out of the optical path with the second pair of mirrors. The mirrors 76, 77, 78 and 79 are arranged such that the length of the optical path between the lens device 75 and the drum 1 when the first pair of mirrors are in the optical path is longer by $4f\cdot\Delta f/(f+\Delta f)$ than the length of said optical path when the second pair of mirrors (and the auxiliary lens 74) are in the optical path. The first pair of mirrors are for the life-size copying and the second pair of mirrors are for reduced-size copying (magnification of $(f-\Delta f)/(f+\Delta f)$ ). In order that one side edge of the life-size image and one side edge of the reduced image may be coincident with each other, the optic axis passing to the drum 1 is parallel-displaced by $\Delta(=l\cdot\Delta f/(f+\Delta f)$ ) in a direction perpendicular to the plane of the drawing sheet during the formation of life-size image or during the formation of reduced image. In the former case, the direction of the displacement is the direction away from that side edge of the image in question and in the latter case, it is the direction toward such side edge. In the former case, the mirrors 76, 77 and in the latter case, the mirrors 78, 79 are tilted from a plane perpendicular to the plane of the FIG. 11 sheet (namely, the plane containing the rotational direction 2 of the drum 1 and the optic axis between the lens device 75 and the mirror 76 or 78 or the optic axis passing to the drum 1), so as to provide the displacement of said optic axis.

In FIG. 11, if the auxiliary lens 74 is of a negative power, this lens will be moved into and out of the optical path with the first pair of mirrors. The mirrors 76, 77, 78 and 79 are arranged such that the length of the optical path between the lens and the drum when the first pair is in the optical path is longer by $4f\cdot\Delta f/(f-\Delta f)$ than the length of the optical path when the second pair is in the optical path. The first pair of mirrors are used for the magnified copying (magnification of $(f+\Delta f)/(f-\Delta f)$ ) and the second pair of mirrors are used for the life-size copying. In order that the corresponding side edges of the magnified and the life-size image may be coincident with each other, the optic axis passing to the drum 1 is parallel-displaced in a direction perpendicular to the plane of the drawing by the first pair or the second pair of mirrors. The amount of displacement $\Delta$ is $l\cdot\Delta f/(f-\Delta f)$. In the former case, the direction of the displacement is the direction away from that side edge of the image in question, and in the latter case, it is the direction toward said side edge. Such displacement of the optic axis is accomplished by the mirrors 76, 77 or 78, 79 being tilted from the plane perpendicular to the plane of the drawing sheet.

Any of the embodiments hitherto described is the apparatus which effects magnified or reduced copying when the main focusing lens and the auxiliary lens are combined together and effects life-size copying when the main focusing lens is singly used. However, it is also possible to enable life-size copying to be effected when the main focusing lens and the auxiliary lens are combined together and to enable magnified or reduced copying to be effected when the main focusing lens is singly used. In such case, the optical path length changing means provides 2F both as the length of the optical path on the original side and the length of the optical path on the photosensitive medium side, with respect to the combined lens system comprising the main focusing lens and the auxiliary lens. F is the focal length of the combined lens system. Two examples of such design will now be described with respect to the devices of FIGS. 5, 6 and 7. In FIGS. 6 and 7, the auxiliary lens 62 has a positive power. The mirror lens 60, 61 has a focal length of (F+F). The mirrors 65 and 66 come into the optical path when the auxiliary lens 62 is retracted from the optical path, whereby the length of the optical path between the lens device and the original carriage is increased by $4F\cdot\Delta F/(F-\Delta F)$. By this, a reduced image at a magnification of $(F-\Delta F)/(F+\Delta F)$ is obtained. The mirrors 65 and 66 may be tilted from the plane perpendicular to the plane of the FIG. 7 sheet to parallel-displace the optic axis in the plane perpendicular to the plane of the drawing sheet in order to make one side edge of the reduced image coincident with the corresponding side edge of the life-size image. With $l$ as the distance between the opposite side edges of the original, the amount of displacement of said optic axis is $l\cdot\Delta F/(F-\Delta F)$ and the optic axis is displaced by this amount in the direction away from that side edge of the original in question.

In FIGS. 6 and 7, the auxiliary lens 62 has a negative power. The mirror lens 60, 61 has a focal length of $(F-\Delta F)$. The mirrors 65 and 66 are movable into and out of the optical path with the lens 62 and, when they are retracted from the optical path, they reduce the length of the optical path between the lens device 42' and the original carriage O by $4F\cdot\Delta F/(F+\Delta F)$. By this, a magnified image at a magnification of $(F+\Delta)/(F-\Delta F)$ is obtained. The mirrors 65 and 66 may be tilted from a plane perpendicular to the FIG. 7 sheet and may be parallel-displaced in a plane perpendicular to the optic axis and the plane of the drawing sheet in order to make one side edge of the magnified image with the corresponding side edge of the life-size image. The direction of the displacement is the direction toward that side edge in question and the amount of the displacement is $l\cdot\Delta F/(F+\Delta F)$.

As will be seen from the foregoing two examples, the same rule as applies to the apparatus in which the main focusing lens is singly used for the life-size copying applies also to the apparatus in which the combined lens system comprising the auxiliary lens and the main focusing lens is used for the life-size copying. That is, when the focal length of the focusing lens device during the life-size copying is changed for decrease, the length of the optical path on the photosensitive medium side is reduced by the optical path length changing means by an amount corresponding to the variation in the focal length to thereby form a reduced copy image or the length of the optical path on the original side is reduced by an amount corresponding to the variation in the focal length to thereby form a magnified copy image. When the focal length of the focusing lens device during the life-size copying is changed for increase, the length of the optical path on the original side is increased by the optical path length changing means by an amount corresponding to the variation in the focal length to thereby form a reduced copy image or the length of the optical path on the photosensitive medium side is increased by an amount corresponding to the variation in the focal length to thereby form a magnified copy image. In any case, it is desirable that simultaneously with the change of the optical path length, the optical path length changing means should displace the optic axis by the amount corresponding to the variation in the focal length in order to make one side edge of the life-size image coincident with the corresponding side edge of the reduced or the magnified image. With the focusing lens device remaining positionally fixed as a whole, one of the optical path length on the original carriage side and the optical path length on the photosensitive medium side is increased or reduced.

Figure 12A:
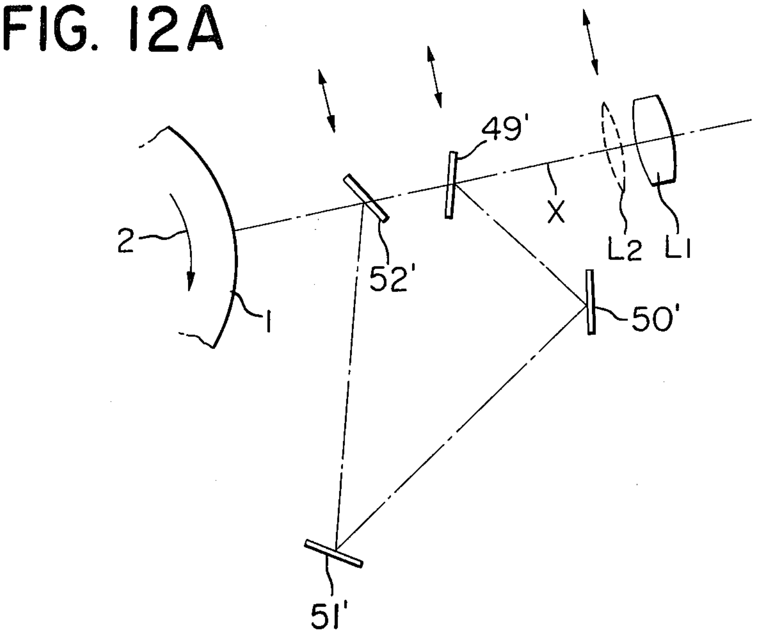
FIGS. 12A, 12B and 12C illustrate further examples of the optical path length changing means.
Figure 12B:
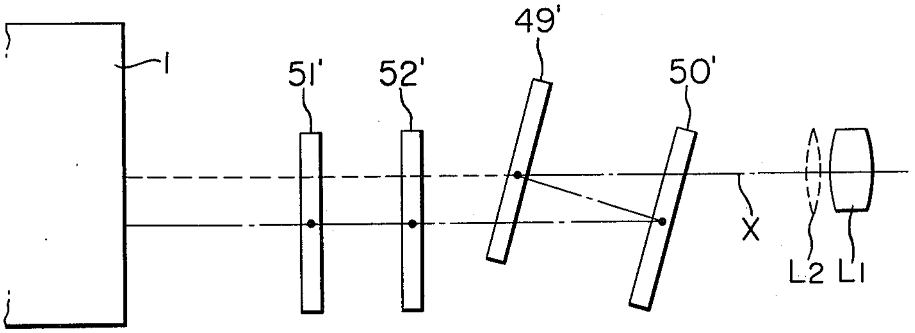
Figure 12C:
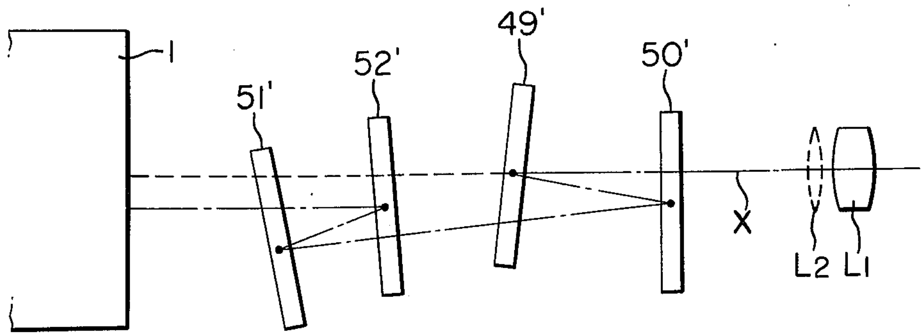

In the embodiments hitherto described, the pairs of mirrors forming part of the optical path length changing means are disposed parallel to each other, but this is not restrictive. FIG. 12A shows an arrangement in which mirrors 49', 50', 51' and 52' are all disposed non-parallel in the optical path length changing means shown in FIG. 1 or FIG. 10. The mirrors 49' and 52' are movable mirrors which may be moved into or out of the optical path with the movement of a movable auxiliary lens L2 into the optical path adjacent to a main focusing lens L1. FIGS. 12B and 12C illustrate a mode of displacement of the optic axis. Both of these Figures are orthogonal projections upon a plane perpendicular to the plane of the FIG. 12A sheet. In FIG. 12B, observing the lines of intersection between various mirrors and the plane of the drawing sheet, the line of intersection on the mirror 49' and the line of intersection on the mirror 50' are parallel to each other, and the line of intersection on the mirror 51' and the line of intersection on the mirror 52' are parallel to each other.

Further, in each of the above-described embodiments, an even number of mirrors are disposed in the optical path of the image forming light beam. This is for preventing the copy image fixed on transfer paper from becoming a laterally inverted image (mirror image) of the original, but an odd number of mirrors may be disposed in such optical path in the copying machines of the electrofax type instead of the image transfer type, namely, the copying machines which use photosensitive paper also usable as the back-up member for the final fixed image.

To make the present invention better understood, the equations used in the foregoing description have been calculated on the basis of the lens formula $1/a+1/b=1/f$, for an apparatus having a focusing lens device whose refractive index is 1 (unity) in any of the original carriage side optical path and the photosensitive medium side optical path and whose principal point is not varied in position even if an auxiliary lens is moved into or out of the optical path near the main focusing lens. ($a$ is the length of the optical path between the surface of the original and the primary principal point of the lens, $b$ the length of the optical path between the surface of the original and the secondary principal point, and $f$ the focal length of the lens.) Therefore, in case of an apparatus in which the above conditions differ, the equations already shown cannot intactly apply in a simple manner, but it equally applies to any of the copying apparatuses according to the present invention that the optical path length changing means increases or decreases one of the original side optical path length and the photosensitive medium side optical path length in accordance with the change in the focal length of the focusing lens device so that the surface of the original being scanned and the photosensitive surface at the exposure station may be optically conjugate with respect to the focusing lens device positionally fixed as a whole.

Further, the photosensitive medium is not restricted to the drum-shaped one but may take the form of a belt movable along an endless path.

What we claim is:

1. A copying apparatus having a variable copying magnification, comprising:

means for supporting an object to be copied;

a photosensitive medium;

focusing lens means for projecting the optical image of said object upon said photosensitive medium, said focusing lens means having a main lens positionally fixed in the optical path between the support means and the photosensitive medium, and a movable auxiliary lens movable into and out of said optical path; and a group of mirrors movable into and out of one of the optical path portions between said focusing lens means and said support means and between said focusing lens means and said photosensitive medium, thereby adjusting the length of said one optical path.

2. An apparatus according to claim 1, wherein said movable group of mirrors is movable into the optical path portion between said focusing lens means and said photosensitive medium, for displacing an entrance position of an optical path extending to the photosensitive medium to position a lateral end of a magnified image of the object on the photosensitive medium in register with a position corresponding to a lateral end of an image under another magnification.

3. An apparatus according to claim 1, wherein said movable group of mirrors is movable into the optical path portion between said focusing lens means and the support means, for displacing an entrance point of an optical path extending to the support means to place a lateral end of a magnified image of the object on the photosensitive medium in register with a position corresponding to a lateral end of an image under another magnification.

4. An apparatus according to claim 1, further comprising a second group of mirrors movable into and out of said one optical path in exchange for the first group of movable mirrors.

5. An apparatus according to claim 4, wherein said second group of mirrors displaces, when moved into said optical path, an optical axis extending from said focusing lens means to place a lateral end of a magnified image of the object on the photosensitive medium in register with a position corresponding to a lateral end of an image under another magnification.

6. An apparatus according to claim 1, wherein at least one mirror in said group of mirrors, when placed in said one optical path portion, is inclined with respect to an optical axis extending from said focusing lens means to displace the optical axis and to place a lateral end of a magnified image of the object on the photosensitive medium in register with a position corresponding to a lateral end of an image under another magnification.

7. An apparatus according to claim 1, wherein said focusing lens means includes an in-mirror type lens as the main lens.

8. A copying apparatus having a variable copying magnification, comprising:

means for supporting an object to be copied;

a movable electrophotographic photosensitive medium;

means for moving said photosensitive medium along a predetermined path;

focusing lens means for projecting the optical image of the object upon said photosensitive medium for use in forming an electrostatic latent image corresponding to the object, said focusing lens means having a main lens positionally fixed in the optical path between the support means and the photosensitive medium, and an auxiliary lens selectively movable into and out of the optical path to change a focal length of said focusing lens means in correspondence with a selected copy magnification; and a group of mirrors selectively movable into and out of one of the optical path portions between said focusing lens means and said support means and between said focusing lens means and said photosensitive medium, to adjust the length of said one optical path to form an image of the object in correspondence with a selected copy magnification, and also to displace the optical axis extending from said focusing lens means to place a lateral end of the image of the object, under any selected magnification, on the photosensitive medium in alignment with a reference line extending in a direction of movement of said photosensitive medium.

9. An apparatus according to claim 8, wherein said main lens provides a one-to-one image onto said photosensitive medium when said auxiliary lens is out of said one optical path.

10. An apparatus according to claim 9, wherein said auxiliary lens has a negative power, and said movable group of mirrors is movable into the optical path portion between said focusing lens means and said support means, and is effective to extend the optical path therebetween, when placed in the optical path, and wherein said auxiliary lens moves into or out of the optical path substantially simultaneously with movement of said group of mirrors.

11. An apparatus according to claim 9, wherein said auxiliary lens has a negative power, and said movable group of mirrors is movable into the optical path portion between said focusing lens means and said photosensitive medium, and is effective to extend the optical path therebetween when placed in the optical path, and wherein said auxiliary lens moves into or out of the optical path substantially simultaneously with movement of said group of mirrors.

12. An apparatus according to claim 9, wherein said auxiliary lens has a positive power, and said movable group of mirrors is movable into the optical path portions between said focusing lens means and said photosensitive medium, and is effective to extend the optical path therebetween when placed in the optical path, and wherein said auxiliary lens moves into or out of the optical path substantially alternately with said group of mirrors.

13. An apparatus according to claim 9, wherein said auxiliary lens has a positive power, and said movable group of mirrors is movable into the optical path portion between said focusing lens means and said support means, and is effective to extend the optical path therebetween when placed in the optical path, and wherein said auxiliary lens moves into and out of the optical path substantially alternately with said group of mirrors.

14. An apparatus according to claim 8, wherein said focusing lens means provides one-to-one image onto said photosensitive medium when said auxiliary lens is placed in said one optical path portion.

15. An apparatus according to claim 14, wherein said auxiliary lens has a negative power, and said movable group of mirrors is movable into the optical path portion between said focusing lens means and said support means, and is effective to extend the optical path therebetween when placed in the optical path, and wherein said auxiliary lens moves into or out of the optical path substantially simultaneously with movement of said group of mirrors.

16. An apparatus according to claim 14, wherein said auxiliary lens has a negative power, said movable group of mirrors is movable into the optical path portion between said focusing lens means and said photosensitive medium, and is effective to extend the optical path therebetween when placed in the optical path, and wherein said auxiliary lens moves into or out of the optical path substantially simultaneously with movement of said group of mirrors.

17. An apparatus according to claim 14, wherein said auxiliary lens has a positive power, and said movable group of mirrors is movable into the optical path portion between said focusing lens means and said support means, and is effective to extend the optical path therebetween when placed in the optical path, and wherein said auxiliary lens moves into and out of the optical path substantially alternately with said group of mirrors.

18. An apparatus according to claim 14, wherein said auxiliary lens has a positive power, and said movable group of mirrors is movable into the optical path portion between said focusing lens means and said photosensitive medium, and is effective to extend the optical path therebetween when placed in the optical path, and wherein said auxiliary lens moves into or out of the optical path substantially alternately with said group of mirrors.

19. A copying apparatus having a variable copying magnification, comprising:

means for supporting an object to be copied;

an electrophotographic photosensitive medium movable along an endless path;

focusing lens means for projecting the optical image of the object upon said photosensitive medium for use in forming an electrostatic latent image corresponding to the object, said focusing lens means having a main lens positionally fixed in the optical path between the support means and the photosensitive medium, and an auxiliary lens selectively movable into and out of the optical path to change a focal length of said focusing lens means in correspondence with a selected copy magnification;

a group of mirrors selectively movable into and out of one of the optical path portions between said focusing lens means and said support means and between said focusing lens means and said photosensitive medium, to adjust the length of said one optical path to form an image of the object in correspondence with a selected copy magnification, and also to displace the optical axis extending from said focusing lens means to place a lateral end of the image of the object, under selected magnification, on the photosensitive medium in alignment with a reference line extending adjacent a lateral end thereof and in the direction of movement of said photosensitive medium;

means for developing the electrostatic latent image formed on said photosensitive medium into a toner image;

means for feeding transfer material, having different sizes corresponding to the selected magnification, to said movable photosensitive medium to be moved substantially in contact with said photosensitive member for receiving the developed image, said transfer material feeding means feeding each sized transfer material with its lateral end aligned with said reference line on said photosensitive member; and separating means, adapted to contact the transfer material adjacent to the lateral end, for separating the transfer material from said photosensitive medium, after the developed image is transferred onto the transfer material.

20. An apparatus according to claim 19, wherein said separating means includes an elongated belt contacted with said photosensitive medium along said reference line over a predetermined length and a plurality of pulleys supporting said belt therearound for travel at the same peripheral speed as the photosensitive medium, said transfer material feeding means feeding the transfer material in a manner that the transfer material of any size contacts said belt at its corresponding lateral portion.

21. An apparatus according to claim 19, wherein said movable photosensitive member is a rotatable drum.

22. An apparatus according to claim 19, further comprising scanning means for effecting optical scanning of theobject through said focusing lens means, said scanning means moving said object in a direction crossing the optical path.

23. An apparatus according to claim 19, further comprising scanning means for effecting optical scanning of the object through said focusing lens means, said scanning means including first movable reflecting means optically faced to and parallel with the object supporting means, and second reflecting means optically faced to said first reflecting means and said focusing lens means, said second reflecting means being movable in the same direction of movement of said first mirror means at a speed which is a half of the speed of the first mirror movement.

24. An apparatus according to claim 19, wherein said group of mirrors includes at least two mirrors supported on a supporting member movable about a shaft, into and out of said optical path.

* * * * *